United States Patent
Brudny et al.

[11] Patent Number: 6,131,618
[45] Date of Patent: Oct. 17, 2000

[54] PROCESS FOR THERMOFORMING PIPES BY MEANS OF AN HF FIELD

[75] Inventors: Guenther Brudny, Marl; Rainer Goering, Borken; Guido Schmitz, Dülmen, all of Germany

[73] Assignee: Huels Aktiengesellschaft, Marl, Germany

[21] Appl. No.: 09/066,747

[22] Filed: Apr. 27, 1998

[30] Foreign Application Priority Data

May 2, 1997 [DE] Germany .......................... 197 18 505

[51] Int. Cl.[7] ...................................................... F16L 9/00
[52] U.S. Cl. .......................... 138/177; 138/178; 264/322
[58] Field of Search .................................. 138/177, 178; 264/322, 323, 479, 484, 491

[56] References Cited

U.S. PATENT DOCUMENTS

| | | | |
|---|---|---|---|
| 5,283,026 | 2/1994 | Okumura et al. | 264/234 |
| 5,707,701 | 1/1998 | Saitoh et al. | 138/137 X |
| 5,718,957 | 2/1998 | Yokoe et al. | 428/36.91 |

FOREIGN PATENT DOCUMENTS 0 730 115 A1  9/1996  European Pat. Off. .

*Primary Examiner*—Patrick Brinson
*Attorney, Agent, or Firm*—Oblon, Spivak, McClelland, Maier & Neustadt, P.C.

[57] ABSTRACT

A thermoforming process for forming a plastic pipe using a high-frequency field to introduce the required heat. The pipes thermoformed according to the invention are used, for example, in the motor vehicle sector.

9 Claims, 1 Drawing Sheet

6,131,618

PROCESS FOR THERMOFORMING PIPES BY MEANS OF AN HF FIELD

FIELD OF THE INVENTION

The present invention relates to pipes which are thermoformed by means of a high-frequency field, and to a process for their production.

BACKGROUND OF THE INVENTION

Pipes used as, for example, fuel lines in the motor vehicle sector usually have high stiffness. These lines must be thermoformed, since it is not possible to install them in an automobile in straight form. In this reshaping process, the previously straight pipe is permanently shaped so that it retains bends and curves at particular desired locations.

Thermoforming using polyethylene glycol is currently a very widespread method for the thermoforming of pipes. In this process, the pipe is generally laid into a template and, together with the template, is immersed into a bath of polyethylene glycol. This bath is heated to a temperature appropriate for the material of the pipe, so that the pipe is heated from outside and becomes soft. This heating reduces the internal resistance of the pipe to bending, i.e. the stresses introduced by bending are relaxed. After the actual thermoforming, the pipe, together with the template, is removed from the bath and cooled back to room temperature in a cooling bath, so that the intended shape of the pipe becomes fixed. A disadvantage of thermoforming with polyethylene glycol is the contamination of waste water caused by the process. Against a background of stricter legal requirements, this is becoming increasingly problematic, with the result that the process is made unattractive on cost grounds.

Another thermoforming process uses hot air, in which the pipe, together with the template, is held in a hot air oven. Because of the relatively poor transfer of heat between hot air and pipe, the cycle times are longer than for thermoforming using polyethylene glycol.

For thermoforming with superheated steam, the pipe is likewise placed into a template. Superheated steam is then conducted through the interior of the pipe, so that the pipe is heated from inside. After the resistance of the pipe to bending has been reduced, the pipe is cooled once again and the shape is thus fixed in the pipe. Thermoforming using superheated steam is, however, costly and time-consuming.

Another route is taken by contact heating. For this, heated metal templates are used to heat the pipe in the regions to be thermoformed. Here, too, long thermoforming times mean that the process is not sufficiently cost-effective A common feature in all of these processes is that the heating of the pipe must largely occur via the conduction of heat, and this is time-consuming because of the poor thermal conductivity of plastics. In order to reduce thermoforming times, attempts to increase the temperatures of the heating media are often made. This, however, can often lead to overheating of the outer surface of the pipe, and even to burning, and this can have a negative effect on the properties of the pipe.

A further process which has been developed for thermoforming is the heating of the pipe using IR radiation. For this, the pipe is irradiated with light from the infrared spectrum. The radiation is absorbed to some extent by the pipe and converted into heat. However, a number of problems exist with this process. Firstly, it is difficult to irradiate the pipe uniformly around its circumference, for example because the pipes are placed in templates and thus are not freely accessible on all sides to the radiation. The heating of the pipe is therefore non-uniform, and this can have a negative effect on the properties of the pipe in service. A further great disadvantage of IR radiation is that the various molding compositions used for fuel lines absorb the IR radiation to different extents. For example, black pigmented pipe molding compositions have very good absorption, and the radiation is therefore absorbed almost immediately at the surface of the pipe. This, however, creates a particularly high risk of localized burning. Absorption of the radiation is generally significantly poorer in the case of unpigmented products, and this results in extended cycle times.

OBJECTS OF THE INVENTION

It is therefore an object of the present invention to provide a process for thermoforming pipes which combines a short cycle time with a heating method which does not damage the pipes.

It is a further object of the invention to provide a process for thermoforming pipes which has as low an energy consumption as possible and does not give rise to emissions which affect the environment.

It is a further object of the invention to provide a thermoforming process which operates using a pipe which is placed into a template, so that no handling of the hot pipe is necessary.

A further objective is a process for thermoforming pipes in which it is possible to heat, and thus thermoform, only a part of the pipe, i.e. the region which is curved.

It is a further object of the invention to provide a thermoforming process suitable not only for single-layer pipes, but also for multilayer pipes, which are used to an increasing extent in automotive construction.

DETAILED DESCRIPTION OF THE INVENTION

Figure 1:
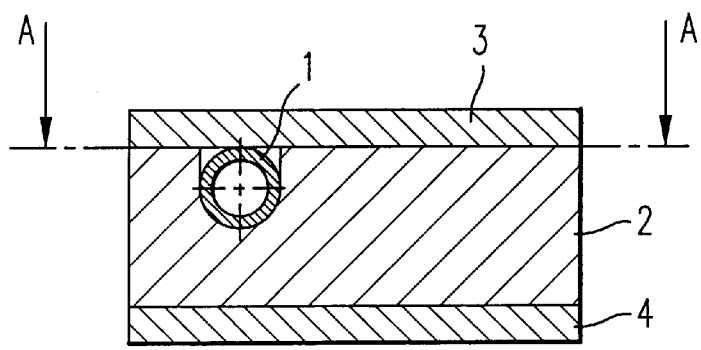
FIG. 1 shows an arrangement for thermoforming pipe.

The above objectives are met by a thermoforming process for forming plastic pipe, where the required heat is introduced by means of a high-frequency field. For this, use is preferably made of an HF generator which converts low-frequency alternating current to high-frequency alternating current. Such devices are known in the art. The frequency of the current which is converted is typically on the order of about 27 MHZ, but it is also possible to use other frequencies such as 20–35 MHZ. The high-frequency alternating electric field is created between two electrodes. The molecules of suitable plastics located between the electrodes are set in vibration as a result of their bipolar nature, and the plastic pipe is heated, from inside outward, by intermolecular friction (see e.g. G. F. Abele, Kunststoff-Füigeverfahren [Methods for Joining Plastics], Carl Hanser Verlag, Munich, Vienna, 1977 or the Herfurth GmbH, Hamburg company publication "Hochfrequenzschweißen in der Kunststoff-Fügetechnik [High-frequency Welding in the Joining of Plastics]", 1986, both incorporated herein by reference).

In the invention the pipe may be formed into the desired shape while the HF field is applied and/or after such application and while still formable.

The cycle time in the invention process is preferably below 1 minute.

The pipes which are formed according to the invention generally preferably have a diameter of up to about 30 mm, and the wall thicknesses may be up to about 3 mm. It is, however, also possible to thermoform pipes of greater diameter and thickness, by modifications to equipment within the skill of the ordinary artisan.

In a preferred embodiment of the invention, the pipe is placed into a template before thermoforming.

With the invention process, it is not only possible to heat the entire pipe in the HF field, but more importantly possible to heat the pipe only at the desired locations. Any effect which the thermoforming procedure has on the properties of the pipe thus occurs only in the region which is curved.

The invention process is equally applicable to single-layer pipes and multilayer pipes. Multilayer pipes are known in the art and are known from a wide variety of patent applications (see for example EP-A-O 730 115, incorporated herein by reference, and the Patent literature cited therein). The single important factor is that the pipe comprises at least one layer which is capable of absorbing energy in the HF field. Examples include polyamides, such as nylon-6, nylon-6,6, nylon-6,12, nylon-11 and nylon-12; polyketone; polyoxymethylene; polyesters, such as polybutylene terephthalate, and polyvinylidene fluoride.

In contrast, the template should consist of a material which absorbs as little energy as possible in the HF field. Examples of suitable materials are polytetrafluoroethylene, polypropylene, polysulfone, polycarbonate and molding compositions based on polyphenylene ether and/or polyphenylene ether/polystyrene blends. Determining whether a material absorbs an HF field is within the skill of the ordinary artisan.

A feature of the invention process is that, in the HF field, the liberation of heat takes place directly in the pipe material, so that the conduction of heat plays practically no part. This achieves a gentle heating without thermal damage to the pipe and also particularly short cycle times. Since only the pipe, and not the surroundings, is heated, the energy consumption for this process is particularly small.

The pipes thermoformed according to the invention may be used, for example, as or in a fuel line, cooling-water pipe, vacuum line, hydraulic pressure line, coolant pipe or pneumatic line.

EXAMPLE

Figure 2:
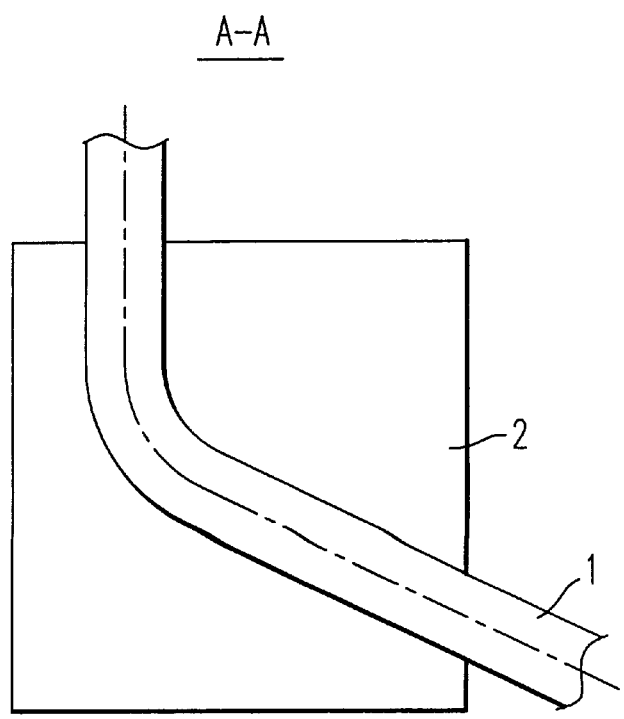
FIG. 2 shows an alternate view of FIG. 1.

FIG. 1 shows a possible arrangement for thermoforming a polyamide pipe. In this example, the pipe (1) is placed into a template (2). For this, the shape which the pipe is intended to adopt is milled into a polyethylene sheet. The cutting depth is selected so that the upper edge of the pipe which will be placed there will not be above the surface of the sheet. On the upper and lower sides, there are plate electrodes (3) and (4), between which a high-frequency field is created for 20 seconds. The pipe is then flushed with cooling air and then removed from the mold. FIG. 2 is a view of FIG. 1 from A—A.

This application is based on German patent application 197 18 505.3, incorporated herein by reference.

We claim:

1. A thermoforming process for forming a plastic pipe, which comprises the steps of applying a high-frequency field to said pipe and forming said pipe.

2. The process as claimed in claim 1, wherein the pipe is placed into a template before forming.

3. The process as claimed in claim 1, wherein the plastic pipe is a single-layer pipe.

4. The process as claimed in claim 1, wherein the plastic pipe is a multilayer pipe.

5. The process as claimed in claim 1, wherein the pipe comprises at least one layer which consists of polyamide, polyketone, polyoxymethylene, polyester or polyvinylidene fluoride.

6. The process as claimed in claim 1, wherein the entire pipe is heated by said high-frequency field.

7. The process as claimed in claim 1, wherein only sections of the pipe are heated by said high-frequency field.

8. A plastic pipe which has been formed by a process as claimed in claim 1.

9. The plastic pipe as claimed in claim 8, in the shape of a fuel line, cooling-water pipe, vacuum line, hydraulic pressure line, coolant pipe or pneumatic line.

\* \* \* \* \*